United States Patent [19]
Deperrois

[11] Patent Number: 5,660,590
[45] Date of Patent: Aug. 26, 1997

[54] FLEXIBLE COUPLING OF METAL ALLOY WITH INTEGRAL STRIPS SEPARATED BY SLOTS FOR ROTARY SHAFT

[75] Inventor: André Raymond Christian Deperrois, Paris, France

[73] Assignee: Societe anonyme dite Hispano-Suiza, Saint-Cloud, France

[21] Appl. No.: 575,888

[22] Filed: Dec. 20, 1995

[30] Foreign Application Priority Data

Dec. 21, 1994 [FR] France .................. 94 15379

[51] Int. Cl.⁶ ............................................. F16D 3/62
[52] U.S. Cl. ................................ 464/69; 464/147
[58] Field of Search ........................ 464/69, 78, 902, 464/147, 106

[56] References Cited

U.S. PATENT DOCUMENTS

| | | | |
|---|---|---|---|
| 1,315,782 | 9/1919 | Leggett | 464/78 |
| 1,316,903 | 9/1919 | Kuentzel | 464/69 |
| 2,101,078 | 12/1937 | Lord et al. | |
| 3,667,031 | 5/1972 | Zierak et al. | 464/78 X |
| 3,750,423 | 8/1973 | Williams | 464/78 X |
| 4,317,339 | 3/1982 | Schmidt | 464/69 |
| 4,321,805 | 3/1982 | Bossler, Jr. | 464/69 |
| 5,163,876 | 11/1992 | Zilberman et al. | 464/69 |

FOREIGN PATENT DOCUMENTS

| | | |
|---|---|---|
| 0 059 267 | 9/1982 | European Pat. Off. . |
| 0 192 096 | 8/1986 | European Pat. Off. . |
| 2 409 417 | 9/1979 | France . |
| 18 00 613 | 9/1969 | Germany . |
| 20 48 152 | 4/1971 | Germany . |
| 24 10 165 | 9/1975 | Germany . |
| 27 38 101 | 7/1978 | Germany . |
| 86 06 870 | 4/1987 | Germany . |

*Primary Examiner*—Daniel P. Stodola
*Assistant Examiner*—Emmanuel M. Marcelo
*Attorney, Agent, or Firm*—Oblon, Spivak, McClelland, Maier & Neustadt, P.C.

[57] ABSTRACT

A flexible coupling between two rotary shafts comprises a flexible metallic member rigidly connected to each of the shafts, the flexible member comprising connection zones interconnected by deformation zones which are traversed by slots perpendicular to the axis of the shafts and dividing the deformation zones into a plurality of strips which are integrally connected with each other and with the connection zones.

10 Claims, 4 Drawing Sheets

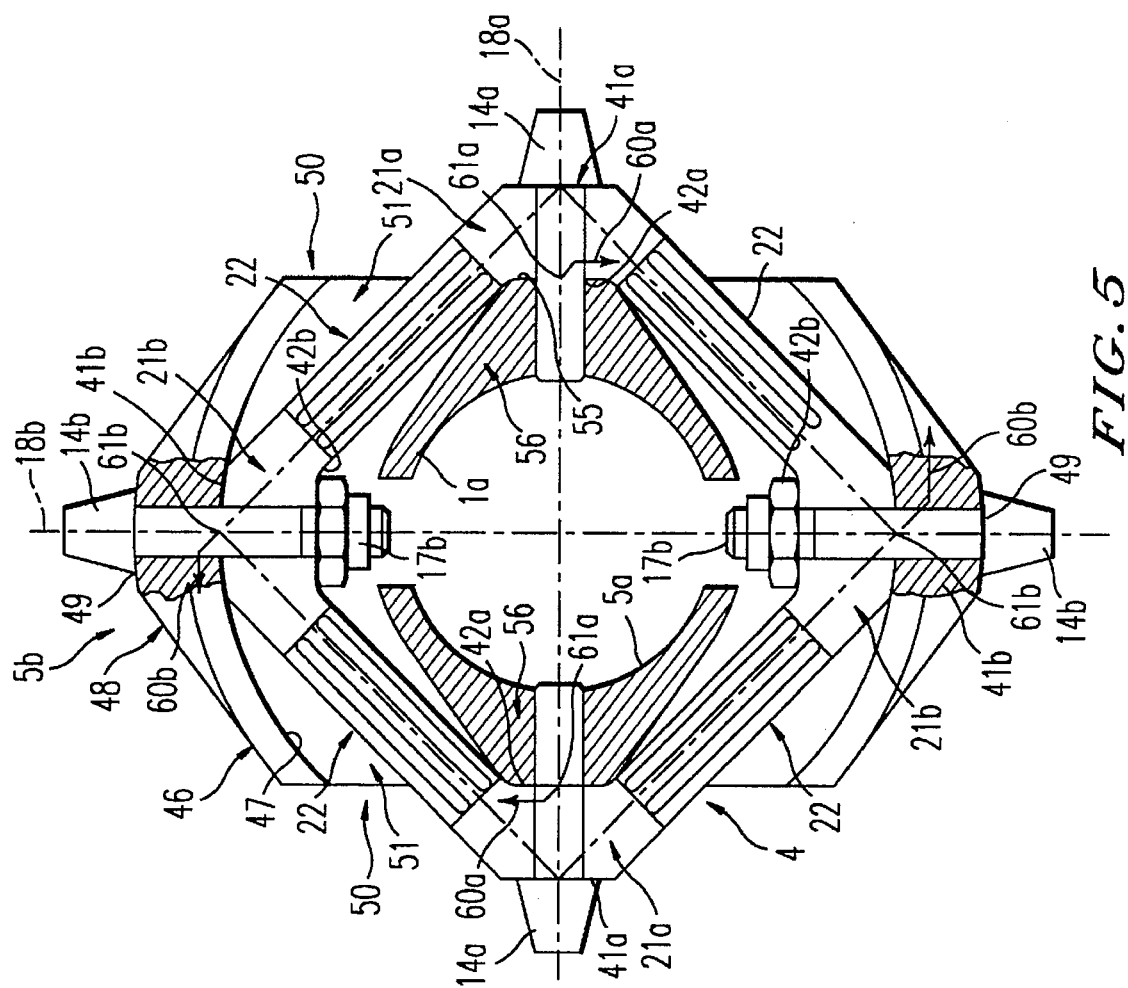
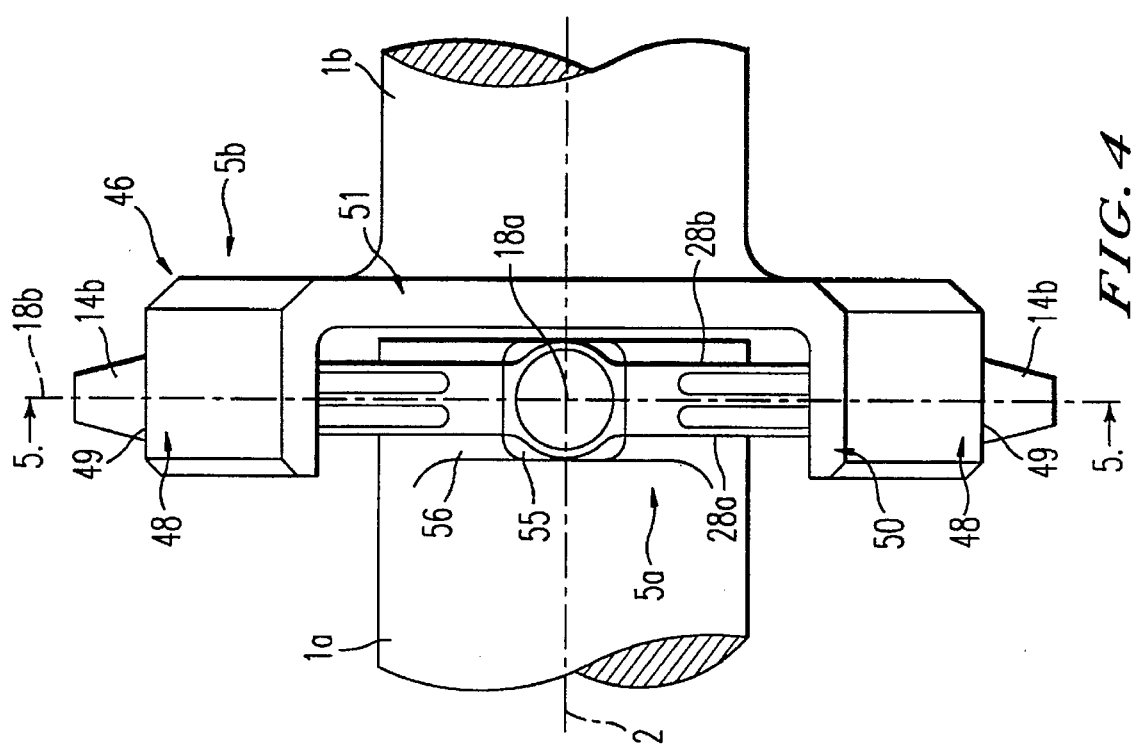

FLEXIBLE COUPLING OF METAL ALLOY WITH INTEGRAL STRIPS SEPARATED BY SLOTS FOR ROTARY SHAFT

BACKGROUND OF THE INVENTION

1. Field of the Invention

The invention relates to a device for flexibly coupling two rotary shafts, and more particularly, though not exclusively, to such devices which are used in aeronautics and which usually include a flexible metallic member rigidly connected to each of the shafts.

Flexible couplings are well known for rotatably connecting two shafts which can suffer a misalignment of their respective axes or a divergence in the positioning of the shafts along their axes. The flexible couplings used in aeronautics must be capable of performing well in a small overall space, with a low misalignment of the shafts and a low axial offset of these shafts. Such couplings, which may have a diameter of less than 100 mm, generally transmit a torque of 1000 Nm at speeds of 20,000 rpm and temperatures reaching 100° C., and must possess total reliability over a specific working life. Good behaviour under vibration is also necessary. This implies:

a high degree of rigidity during rotation, so as not to promote the development of oscillations in the rotational movement; and, a reduction in oscillation of the flexible parts of the coupling in directions parallel to the axis of rotation.

2. Summary of the Prior Art

Such couplings usually include a metallic flexible member, means for connecting the flexible member to the two shafts, and means for reducing vibrations in the coupling.

When the coupling is to operate in both directions of rotation, the flexible member includes deformable elements which are subjected to traction in one direction of rotation and compression in the other, and other deformable elements acting in an opposite manner.

In French Patent No. 2 409 417 a coupling device is disclosed in which the flexible member comprises a stack of spring steel leaves which are held spaced from one another and are rigidly bolted to two plates at the end of each shaft. In a first embodiment, the leaves are generally in the shape of a regular convex polygon, and are spaced apart by washers. In a second embodiment, the leaves are in the form of segments arranged along the sides of a regular polygon and bolted at their ends to the two plates, the leaves of one side being spaced apart by having the leaves of the two adjacent sides interleaved between them. In both cases, a damping material is provided between the leaves at the spaces where the latter are likely to vibrate, so as to reduce these fatigue generating vibrations, as well as the mutual friction resulting therefrom, such friction causing wear of the leaves.

One of the problems associated with such devices is the concentration of stresses at the edges of the connection zones of the flexible member, this concentration reducing the resistance of the coupling to breakage and fatigue. This effect is increased as a result of the faces of the deformable elements being at a sharp angle to the edge of the means which keeps them apart, whether this be washers or other deformable elements.

Another problem which tends to occur when the deformable elements are subjected to compression is the development of an instability deformation termed "buckling". It is well known that buckling imposes very substantial stresses on couplings, and experience has shown that breaks are most likely to occur in deformable elements when they are in compression. The deformable elements must be thin to restrict the stresses occurring as a consequence of misalignment of the shafts, but this thinness makes them more vulnerable to buckling.

The occurrence of buckling deformation is also promoted by:

bending of the deformable elements resulting from misalignment of the shafts; and, the vibrations and resonances to which the flexible elements are subjected when these elements bend as a consequence of the misalignment of the shafts occurring in alternation.

Another problem stems from the cantilever mounting of the flexible member which is bolted to the plates parallel to the axis of the shafts. This arrangement creates a lever effect sensitive to the forces of the transmission torque which are perpendicular to the axis of the shafts, this lever effect itself causing twisting of the connecting means and an additional deformation of the flexible member causing further stress and increased risks of buckling.

German Patent No. 2 048 152 discloses a flexible coupling comprising a unitary disk-shaped flexible member having a plurality of radial slots forming the resilient leaves. The flexible member is made of rubber-like material or some other suitable non-metallic material moulded over bushes through which pins can pass to enable a connection to be made to the shafts. The flexible member as described and shown in the drawings requires a very flexible material such as rubber, and cannot be used for the problem to be solved by the present invention, as it would not withstand the high temperatures to which it would be exposed and it would not possess sufficient rigidity during rotation for the high torques to be transmitted.

European Patent No. 0 059 267 discloses a flexible coupling in which the flexible member is constituted by leaves made of fiber-reinforced synthetic material and moulded together so as to form a unitary flexible member. Such a flexible member cannot be used to solve the present problem for the same reasons as apply to the above-mentioned German patent. Moreover, the flat arrangement of the reinforcing fibers does not enable the latter to oppose the stress concentrations on the surface of the leaves at the edges of the connection zone. The synthetic material consequently has a tendency to form cracks in this area, which makes the coupling fragile and shortens its life.

SUMMARY OF THE INVENTION

With a view to overcoming the aforementioned problems associated with the known flexible shaft couplings, according to the invention there is provided a device for flexibly coupling two rotary shafts which have an axis of rotation and are capable of becoming misaligned, said coupling device comprising a flexible member made of a metal alloy having a high elastic limit, and means for connecting said flexible member to said two rotary shafts, said flexible member comprising a plurality of connection zones at which said connecting means connects said flexible member to said rotary shafts, and deformation zones interconnecting said connection zones, said deformation zones each comprising a plurality of strips which are perpendicular to said axis and interconnect said connection zones at opposite ends of said deformation zone, said strips of each said deformation zones being integral with each other and with said connection zone interconnected thereby and being separated by first slots extending completely through said deformation zone in a direction perpendicular to said axis, said slots having rounded ends.

Preferably the flexible member has four connection zones. This increases the length of the deformation zones and consequently reduces the rigidity of the flexible member, as well as the occurrence of stresses associated with the deformation of the flexible member. The said connection zones are arranged at the apices of a rectangle, with two diagonally opposite connection zones each being connected to one shaft, and the other two diagonally opposite connection zones being connected to the other shaft.

To improve the resistance of the strips to buckling, the side walls of each slot, and thus the strips which they separate, are interconnected by at least one stiffening piece, which is preferably formed integrally with the strips.

In a first embodiment of the invention, the flexible member comprises a closed succession of connection zones alternating with the deformation zones, with one pair of alternate connection zones connected to one shaft and the other pair of connection zones connected to the other shaft. Preferably, the connection zones will be arranged at the apices of a square, and the deformation zones will form the sides.

In a second embodiment of the invention, the flexible member is composed of links, each having a first zone for connection to one of the shafts, a second zone for connection to the other shaft, and a deformation zone between the first and second zones. To solve the problem of the deflection of the means connecting the flexible member to the two shafts, the connecting means is preferably arranged to clamp the flexible member to the shafts, for example by bolting, in a radial direction. In a preferred embodiment, the connecting means comprises a drum rigidly connected to one of the shafts at its end, bosses on the end of the other shaft and positioned inside the drum, clamping means such as bolts for clamping the flexible member against the inside wall of the drum in a radially outward direction, and clamping means such as screws for clamping the flexible member onto the bosses in a radially inward direction. The drum preferably has openings facing the connection zones of the flexible member at which the latter is clamped to the bosses. These openings can be widened, thus reducing the drum to a fork in which the branches would be enlarged at the base.

An advantage of the invention is that it permits the flexible member to be mounted in a simple and balanced manner which can be carried out without special tooling at any maintenance site.

Manufacture of the flexible member is an economic operation since the cutting of the slots can be carried out micromechanically, by electroerosion or by chemical wire machining.

The invention also enables titanium bars, which are easy to obtain, to be used as opposed to sheets thereof. It is known that titanium alloys may be endowed with a strength comparable to that of some steels having modulus of elasticity or Youngs modulus which is twice as low. This makes it possible to increase the suppleness of the strips while maintaining the same strength, thus reducing the deformation stresses. It also makes it possible to increase the thickness of the strips, and hence the resistance of these strips to buckling. The flexible member will thus preferably be made of an alloy of the titanium aluminium-vanadium (TA6 V) group.

Further preferred features and advantages of the invention will become apparent from the following description of the preferred embodiments, given by way of example only, with reference to the attached drawings.

BRIEF DESCRIPTION OF THE DRAWINGS

FIG. 4 shows a side view of a third embodiment of a flexible coupling, in which the flexible member is clamped to the shafts in radial directions;

FIG. 5 is an axial, part sectional view on the line 2—2 in FIG. 4, of the third embodiment.

It should be noted that in FIGS. 1 to 7 the thickness of the strips and of the slots in the flexible members has been increased to improve the clarity of the drawings.

DESCRIPTION OF THE PREFERRED EMBODIMENT

Figure 1:
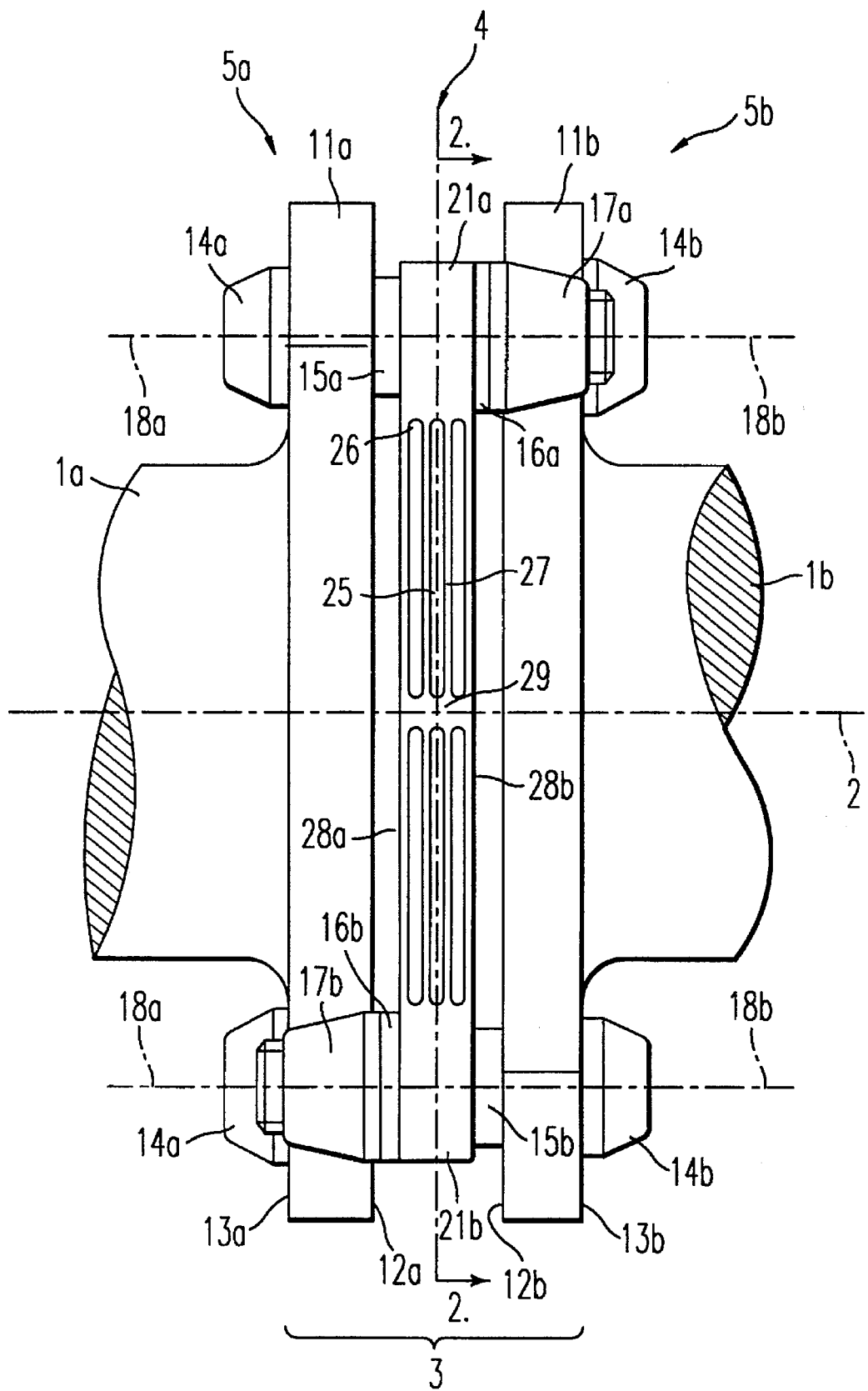
FIG. 1 is a side view of a first embodiment of a flexible coupling in accordance with the invention, comprising a unitary square flexible member.
Figure 2:
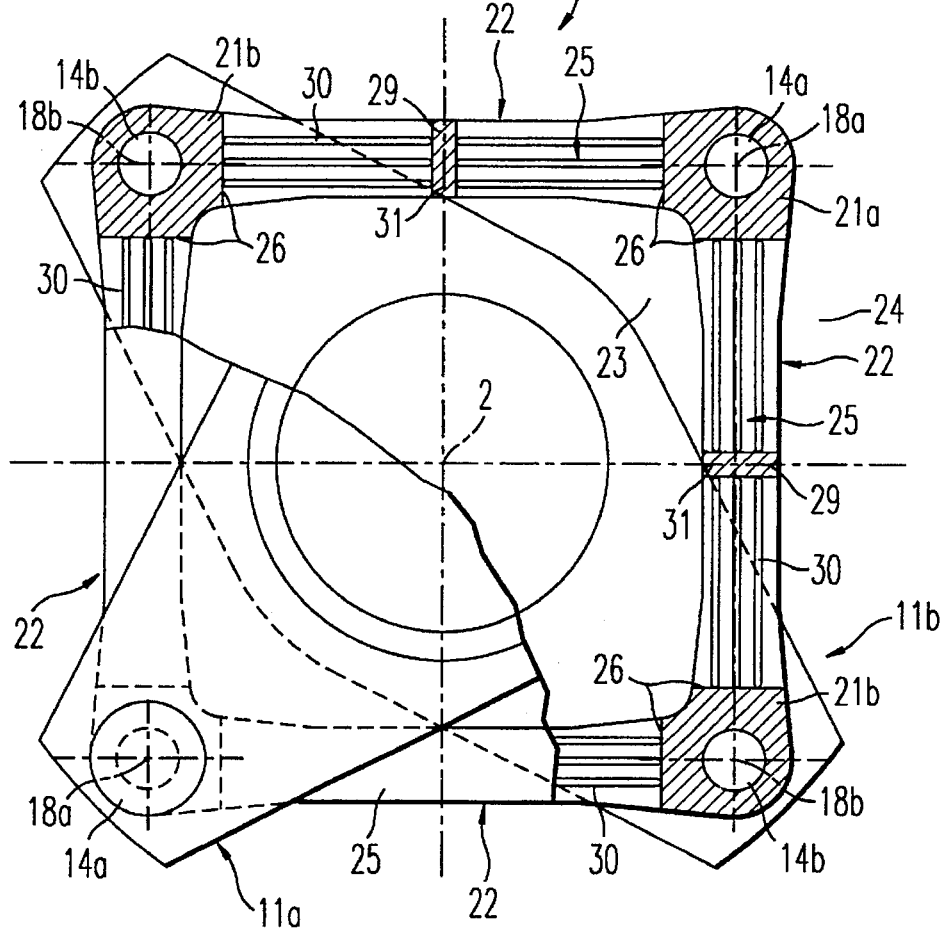
FIG. 2 is an axial view, partly in section on the line 1—1 in FIG. 1, of the first embodiment.

In the first embodiment shown in FIGS. 1 and 2, the two half-shafts 1a and 1b, which rotate around the geometric axis of rotation 2, are connected by a flexible coupling 3 comprising a flexible member 4 and connecting means 5a, 5b for fixing the flexible member 4 to the shafts 1a and 1b respectively. The connecting means 5a, 5b include two facing plates 11a and 11b which are integral with the shafts 1a and 1b respectively, each plate 11a, 11b having a lateral face 12a, 12b which is perpendicular to the axis 2 and faces the lateral face of the other. The plates 11a, 11b each also have a face 13a, 13b perpendicular to the geometric axis 2 and situated on the opposite side from the face 12a, 12b.

The flexible member 4 is bolted to the plates 11a and 11b. For this purpose the connecting means 5a, 5b includes bolts 14a, 14b bearing against the faces 13a, 13b respectively and passing through the plates 11a, 11b via holes which are not referenced, washers 15a, 15b for location around the bolts between the faces 12a, 12b and the flexible member 4, clamping washers 16a, 16b and nuts 17a, 17b. The connection zones 21a, 21b of the flexible member 4 are clamped between the washers 15a, 15b and the clamping washers 16a, 16b in directions parallel to the axis 2 by tightening the nuts 17a, 17b on the bolts 14a, 14b, the geometric axes 18a, 18b of the bolts 14a, 14b and the through holes of the plates 11a, 11b being parallel to the axis 2. As shown in FIG. 2, the flexible member 4 is generally in the shape of a square, and has four connection zones 21a, 21b, arranged at the apices of the square and four deformation zones 22 arranged along the sides of the square and interconnecting the connection zones 21a, 21b pairwise. Each connection zone 21a, 21b has a non-referenced through hole on the geometric axis 18a, 18b and through which a bolt 14a, 14b passes to clamp the flexible member 4 to the respective plate 11a, 11b. The connection zones 21a are arranged alternately with the connection zones 21b at the apices of the square, and each deformation zone 22 integrally interconnects a connection zone 21a with a connection zone 21b. The flexible member 4 defines, by the succession of the connection zones 21a, 21b and the deformation zones 22, a closed line separating an inner space 23 containing the axis 2 from an outer space 24 surrounding the flexible member 4. A plurality of slots 25, each in a plane perpendicular to the axis 2, extend right through each deformation zone 22 and establish communication between the inner space 23 and the outer space 24. These slots 25 extend through each deformation zone 22 over a substantial part of its length in order to impart greater flexibility to them, the ends 26 of the said slots lying in the vicinity of the connection zones 21a, 21b and at the limit against these connection zones 21a, 21b. Referring back to FIG. 1, it will be seen that the slots 25 are stacked in a direction parallel to the axis 2, and that the material between the slots 25, and between the slots 25 and the flat side faces 28a and 28b of the flexible member 4 define a stack of flat strips 27 which are separated by the slots 25 and are perpendicular to the axis 2. These strips 27 are integrally connected to the connection zones 21a, 21b and are hence also integrally connected with each other by the continuity of material through the connection zones.

The slots 25 do not pass through the connection zones 21a, 21b, and this enables the flexible member 4 to be held by being bolted and clamped through these connection zones 21a, 21b to the plates 11a, 11b.

The ends 26 of the slots 25 are rounded so as to reduce the concentration of stresses at this area of the strips 27.

In order to improve the buckling resistance of the strips 27, these strips may be supported by stiffeners interconnecting the side walls of the slots 25, and preferably formed integrally with the strips. In a preferred embodiment, the slots 25 are subdivided into segments, and the stiffeners 29 are constituted by the material which remains between the adjacent ends of these segments. The junctions of the stiffeners 29 with the side walls of the slots 25 are also radiussed to reduce the concentrations of stresses. In the embodiment illustrated in FIGS. 1 and 2, each slot 25 includes only one stiffener 29, situated half-way between the ends 26 of the slot. In an alternative embodiment, each slot 25 has two stiffeners 29 spaced from the ends 26 by a distance approximately equal to one third of the length of the slot 25.

Figure 6:
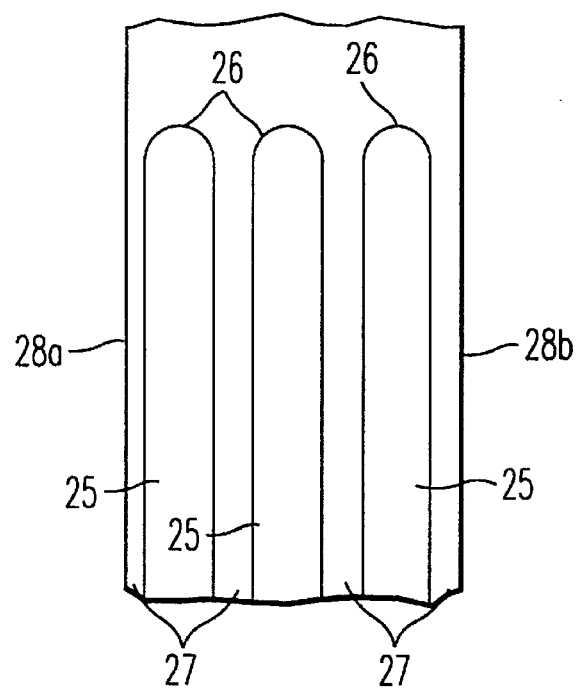
FIG. 6 shows part of the flexible member in which the strips at the center of the deformation zones are thicker than the strips at the sides of the deformation zones of said flexible member.

The axially outer strips 27 i.e. towards the side faces 28a, 28b of the flexible member 4, are more deformed than the strips situated at the center and, consequently, must bear greater deformation stresses, which reduces their ability to transmit the torque between the shafts 1a, 1b. Accordingly, as shown in FIG. 6, it will be preferable for the strips 27 to have different thicknesses, being thinner towards the side faces 28a, 28b, and thicker at the center. This will be achieved simply by suitably selecting the positions and/or widths of the slots 25.

Figure 7:
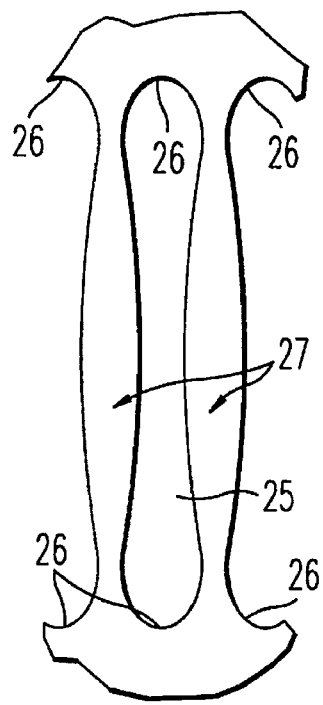
FIG. 7 shows part of the flexible member in which the thickness of the strips are greater in the central region of said strips.

Advantageously also, as shown in FIG. 7, the slots 25 may be made less wide at the center than at their ends 26, and an equivalent thickening will be given to the side faces 28a, 28b in the region of the central area of the strips 27. The effect of this is to increase the width of the strips 27 in their central area, and to decrease this width towards their ends, which improves their resistance to buckling and consequently their ability to transmit the torque between the shafts 1a, 1b. The widening of the strips 27 in their central area may also be achieved by designing the slots 25 with a curved profile, and the side faces 28a, 28b with a corresponding bulge.

In order to reduce the residual stresses caused by deflections of the flexible member 4 in a plane perpendicular to the geometric axis 2, it is preferable also to provide the deformation zones 22 with a plurality of parallel second slots 30, each situated in a plane parallel to the axis 2 and parallel to the corresponding side of the square formed by the flexible member 4. As shown in FIG. 2, these second slots 30 extend through the flexible member 4 in an axial direction and open out in the side faces 28a, 28b of the flexible member 4. Advantageously, stiffeners 31 will also be provided between the side walls of the second slots 30, these stiffeners preferably being similar to the stiffeners 29 and sited in the same places.

It will be appreciated that the sets of slots 25 render the deformation zones 22 more flexible by dividing them into strips 27, and that the sets of second slots 30 subdivide these strips 27 into bars imparting flexibility to the flexible member 4 in the direction of the width of the strips 27.

Figure 3:
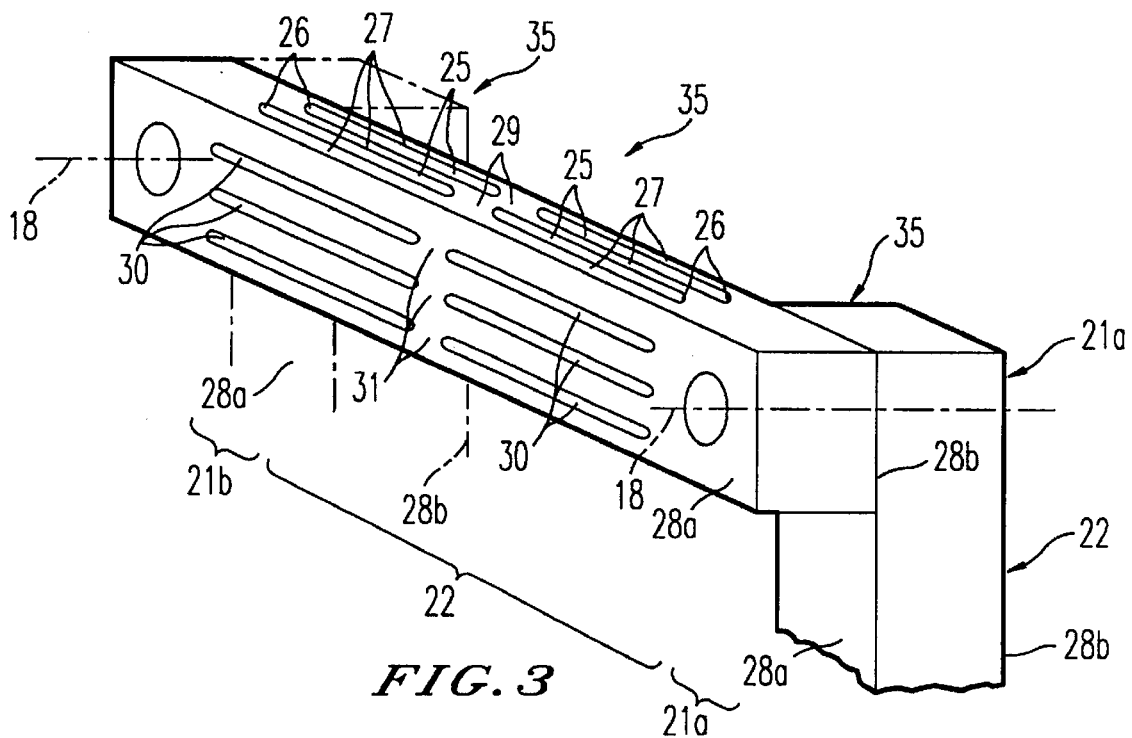
FIG. 3 of the flexible member of a second embodiment of the flexible coupling of the invention, in which the flexible member is composed of links.

Turning now to the second embodiment which is illustrated in FIG. 3, the flexible member, which is not shown in full, is formed by a plurality of separate links 35 each comprising a zone 21a for connection to the shaft 1a, a zone 21b for connection to the shaft 1b, and a deformation zone 22 extending between, and integral with, the connection zones 21a and 21b. The connection zones 21a, 21b each have a through hole for allowing bolts, not shown in FIG. 3, to pass through to secure the link, by clamping, to the respective shaft. The axes 18 of the holes are parallel to the axis of rotation 2, which is not shown. The links 25 are arranged to define a regular polygon, of which the axes 18 constitute the apices and the deformation zones the sides. It will be understood that the make-up of a link 35 is in every respect similar to one side of the unitary flexible member 4 of the first embodiment as defined by two connection zones 21a, 21b and their interconnecting deformation zone 22.

In the arrangement shown, the flexible member 4 comprises links placed end to end to define a closed polygon, each link 35 being clamped with its connection zone 21a against the connection zone 21a of one adjacent link 35 so that faces 28a and 28b are in contact and the axes 18 of their through holes are aligned, and with its other connection zone 21b against the connection zone 21b of the other adjacent link 35 in a similar manner. Thus, in each pair of adjacent links 35, one link is subjected to traction and the other to compression during rotation of the shafts.

In an arrangement where the shaft 1a or 1b is driven by the other in one direction only, the flexible member 4 need only have the links 35 subjected to traction.

As already described, the flexible member 4 in the first two embodiments is mounted on two plates 1a, 1b perpendicular to the axis 2, and it is fixed to these plates by bolting along axes 18a, 18b parallel to the axis 2. This frequently used mounting suffers from the drawback of having the flexible member 4 cantilevered from the plates 11a, 11b, a situation which produces, during the transmission of torque between the shafts 1a, 1b, parasitic torques on the plates 11a, 11b and the flexible member 4 in the region of the bolting points. These parasitic torques bring about twisting of the plates 11a, 11b, and of the flexible member 4, and the twisting of the flexible member 4 produces parasitic stresses which reduce its ability to transmit the torque between the shafts 1a, 1b.

FIGS. 4 and 5 illustrate an embodiment of the invention in which this problem is avoided. In this embodiment the flexible member 4 is generally square-shaped and has connection zones 21a, 21b, and deformation zones 22 therebetween having slots 25 with rounded ends 26, strips 27, stiffeners 29, and second slots 30 in a manner substantially identical to the first embodiment described earlier. For the sake of brevity, therefore, only those elements of the flexible member 4 which differ from the first embodiment will be described.

In this case the connection means 5a, 5b secure the flexible member 4 by clamping along axes 18a, 18b which coincide with the diagonals of the square defined by the member 4, and which are in a plane perpendicular to the rotational axis 2 and intersect at this axis 2. The connection zones 21a, 21b are respectively traversed by through holes on these axes 18a, 18b and each have a bearing surface 41a, 41b facing radially outwards and a bearing surface 42a, 42b facing radially inwards. The bearing surfaces 41a, 41b or 42a, 42b of each connection zone 21a, 21b are mutually parallel and perpendicular to the respective axis 18a, 18b.

The connection means 5b comprises a drum 46 which is integral with the shaft 1b and is open towards the shaft 1a, the drum defining an inner part-cylindrical wall 47 coaxial with the axis 2. The drum 46 has on its outer surface two diametrically opposite bosses 48 each defining an outwardly facing bearing surface 49 perpendicular to the axis 18b, and each having a through hole on the axis 18b.

The flexible member 4 fits into the drum 46 with a slight clearance between the bearing surface 41b and the wall 47 of the drum 46, and is bolted to the drum 46 along the axis 18b. For this purpose, the connecting means 5b also comprises two bolts 14b passing right through the aligned holes of the bosses 48 and the connection zones 21b along the axis 18b, and two nuts 17b screwed on the bolts 14b. The bolts 14b and the nuts 17b thus secure the flexible member 4 to the drum 46 by a radially outward clamping along the axis 18b between the bearing surface 42b and 49.

The drum 46 has two side openings 50 centered on the axis 18a and thus facing the connection zones 21a, these openings 50 being of sufficient size to allow access from outside to the connecting means 5a for connecting the flexible member 4 to the shaft 1a. The end of the drum 46 is defined by a rigid wall 51 perpendicular to the axis 2 and integral with the shaft 1b.

The connecting means 5a comprises a pair of diametrically opposed bosses 56 on the periphery of the shaft 1a at its end facing towards the shaft 1b, these bosses 56 defining two outwardly facing bearing surfaces 55 which are preferably flat and centered on the axis 18a and are perpendicular to it. The flexible member 4 fits on the bosses 56 with a reduced clearance or slight interference between the bearing surfaces 42a, 55, and is secured to them by two bolts 14a passing through the connection zones 21a on the axis 18a and screwing into the bosses 56. These bolts 14a thus hold the flexible member 4 against the bearing surfaces 55 by a radially inward clamping along the axis 18a between the bearing surfaces 41a and 42a.

With such an arrangement, as a result of the torque transmitted between the shafts 1a, 1b, the flexible member 4 exerts on the connecting means 5a, 5b tangential forces 60a, 60b which are applied in the vicinity of the points 61a, 61b of intersection of the axes 18a, 18b with the bearing surfaces 55 and the wall 47 respectively. The bosses 56 oppose the forces 60a with minimal deflection, as their height is limited and they extend substantial distances around the periphery of the shaft 1a on both sides of the axis 18a. Similarly, the drum 46 opposes the forces 60b with minimal deflection as a consequence of its width on both sides of the axis 18b.

It will be noted that the openings 50 of the drum 46 may be just sufficient for the fitting of the bolts 14a, the drum 46 then constituting a protective envelope for the flexible member 4.

On the other hand, the openings 50 may, if preferred, be very large, effectively limiting the drum 46 to a fork with wide branches.

The invention is, of course, not limited to the embodiments which have been described, but is intended to cover all the alternatives which may be envisaged without departing from its scope or its spirit.

For example, instead of the flexible member 4 being rectangular, it may be hexagonal, having three points for fixing to one shaft and three points for fixing to the other. A flexible member in the shape of a polygon having more than six apices would be more rigid, and limited only to particular applications.

Also, the slots 25 and 30 may be lined with a visco-elastic material adhering to the walls so as to improve the damping of any resonance. Indeed, the flexible member 4 may itself be embedded in a damping and protective material.

I claim:

1. A device for flexibly coupling two rotary shafts which have an axis of rotation, said coupling device comprising:

a flexible member made of a metal alloy having a high elastic limit;

means for connecting said flexible member to the two rotary shafts;

said flexible member comprising a plurality of connection zones at which said connecting means connects said flexible member to the two rotary shafts, and deformation zones interconnecting said connection zones, said deformation zones each comprising a plurality of strips which are perpendicular to said axis and interconnect said connection zones at opposite ends of said deformation zones, said strips of each said deformation zones being integral with each other and with said connection zones interconnected thereby and being separated by first slots extending completely through said deformation zones in a direction perpendicular to said axis, said first slots having rounded ends; and said means for connecting said flexible member to the two rotary shafts exerts a clamping force on said flexible member in directions which are radial to said axis.

2. A device as recited in claim 1, wherein said flexible member possess four connection zones.

3. A device as recited in claim 1, wherein each of said first slots have side walls, said strips of each said deformation zones are interconnected by at least one stiffener extending between the side walls of said first slots separating said strips.

4. A device as recited in claim 3, wherein said at least one stiffener is integral with said strips.

5. A device as recited in claim 1, wherein said flexible member is made of a titanium alloy of the group TA6 V.

6. A device as recited in claim 1, wherein said connecting means comprises a drum rigidly connected to one of the two rotary shafts and having an inner wall, bosses disposed on the periphery of the other of the two rotary shafts, means for clamping said flexible member against said inner wall of said drum in a radially outward direction, and means for clamping said flexible member against said bosses in a radially inward direction.

7. A device as recited in claim 6, wherein said drum has side openings facing the connection zones of said flexible member at which said flexible member is clamped to said bosses.

8. A device as recited in claim 1, wherein each of said deformation zones further comprise a plurality of second slots oriented in a direction parallel to said axis, said second slots intersecting said first slots and dividing said strips into a plurality of small bars imparting flexibility in the direction of the width of said strips.

9. A device as recited in claim 1, wherein said deformation zones each have a center and sides, said strips of said deformation zones include strips located at the center of said deformation zones and strips located at the sides of said deformation zones, said strips at the center of said deformation zones are thicker than said strips at the sides of said deformation zones of said flexible member.

10. A device as recited in claim 1, wherein said strips of said flexible member have a central region, the thickness of said strips is greater in the central region of said strips.

* * * * *